United States Patent [19]

Elko et al.

[11] Patent Number: 5,339,405
[45] Date of Patent: Aug. 16, 1994

[54] COMMAND QUIESCE FUNCTION

[75] Inventors: David A. Elko, Poughkeepsie; Jeffrey A. Frey, Fishkill; Audrey A. Helffrich, Poughkeepsie; Jeffrey M. Nick, Fishkill; Michael D. Swanson, Poughkeepsie, all of N.Y.

[73] Assignee: International Business Machines Corporation, Armonk, N.Y.

[21] Appl. No.: 860,330

[22] Filed: Mar. 30, 1992

[51] Int. Cl.[5] .............................................. G06F 11/00
[52] U.S. Cl. .................................................. 395/575
[58] Field of Search ............... 395/575, 200, 250, 425, 395/650, 307, 275, 440, 325; 371/7.1, 15.1, 8.2, 20.1, 20.2, 11.2; 364/935.2, 935.6, 935.7, 966.1, 966.2

[56] References Cited

U.S. PATENT DOCUMENTS

| | | | |
|---|---|---|---|
| 4,030,072 | 6/1977 | Bjornsson | 340/172.5 |
| 4,451,916 | 5/1984 | Casper et al. | 370/16 |
| 4,937,825 | 6/1990 | Ballard et al. | 371/20.1 |
| 4,970,640 | 11/1990 | Beardsley et al. | 364/200 |
| 5,047,923 | 9/1991 | Elstner et al. | 364/200 |
| 5,121,390 | 6/1992 | Farrell et al. | 395/94.1 |
| 5,170,472 | 12/1992 | Cwiakala et al. | 395/275 |
| 5,195,085 | 3/1993 | Bertsch et al. | 370/13 |
| 5,220,663 | 6/1993 | Bauchot et al. | 395/575 |

Primary Examiner—Robert W. Beausoliel, Jr.
Assistant Examiner—Norman Wright
Attorney, Agent, or Firm—Floyd A. Gonzalez; Robert W. Berray

[57] ABSTRACT

One or more Central Processing Complexes (CPC), each with one or more programs being executed, become command initiators by issuing commands requesting an action to be performed by a command responder. The responder is a Structured Electronic Storage (SES) which comprises a coupling facility. The SES receives commands to be executed over a plurality of links interconnecting the CPC's and SES, and returns a response to the program that issued the command. The SES is the focal point for the CPC's to share data, control locks, and manipulate lists or queues. This couples the autonomous CPC's into a System Complex (Sysplex) displaying a single system image. An indicator associated with each of the links is set by SES when it appears to a initiator that problems on the link exist. The set state of any indicator prevents SES from starting execution of any subsequent commands. This preserves the orderly, sequential execution of commands to insure consistent states of data in SES, and allows the program that issued the command to determine exactly how the command ended at SES. Data associated with execution of the command is stored in a status save area of SES for subsequent access by the program.

8 Claims, 3 Drawing Sheets

COMMAND QUIESCE FUNCTION

FIELD OF THE INVENTION

This invention relates to interconnection of data processing systems through a coupling facility, and more particularly to maintaining consistency of data and control structures in the coupling facility when there are real or suspected errors in the links that form the interconnections.

BACKGROUND OF THE INVENTION

In a data processing system, data and system control structures may be shared between several programs running on a single central processing complex (CPC), or shared between several CPC's. The shared facility may be an I/O device control unit, or a specialized coupling facility comprised of a Structured Electronic Storage (SES).

Commands are communicated over a link to the shared facility through channel apparatus. The channel expects a response to the request from the shared facility resulting from execution of the command. If a response is not received within some predetermined time, or the channel detects signal errors on the link, it will post an interface control check (IFCC) to be reported to the requesting program. At this point the program must recover the failed command and free resources that are held for the command. If the command is still in execution at the shared facility after the IFCC is presented, the program is faced with significant difficulties in completing the recovery action.

SES as a shared facility provides a program controlled command execution processor which accesses a bulk, non-volatile, electronic storage. The bulk storage is comprised of system storage for system-wide or global control structures, and storage for CPC-program created data and list structures. All of these structures can be shared among programs in one CPC, or among plural CPC's. Commands are received over a plurality of links. Link buffers are provided to receive commands and/or data, and store SES responses for transfer over the link to a CPC. When SES interconnects a plurality of CPC's, a system complex (Sysplex) is created to form a single system image from all of the autonomous CPC's.

Consider the situation where a program has obtained a lock to serialize a data item X. After the serialization has been obtained, the program attempts to update the contents of X in SES by issuing a command to write X to SES and store new values for X in its existing location. However, an IFCC is presented to the program while the command is still executing. Recovery for the command releases the serialization to make the data available for other programs.

A second program running on a different CPC obtains the serialization for X. Once serialization is obtained, the program assumes that it will have a consistent and unchanging view of the data item X. The program may wish to read X, update X, or even delete X. In each case, the continuing execution of the previously failed command may cause problems. For instance, two successive reads of X may see different values if a store occurs between the read operations. The program would see this as an error since it owns the serialization for the data. Another problem would occur if the program attempted an update of X by reading X, updating X in main storage and then writing X back to SES. A subsequent store by the previous command could cause the update to be lost. Finally, if the program chose to delete X from SES, the failed command may restore an old version of X after the delete had occurred. In each case, correct actions by the second program would be construed as errors. It is therefore very important that no subsequent commands are allowed to execute following posting of IFCC before the command on which IFCC was posted has either completed or been undone.

SUMMARY OF THE INVENTION

An object of the present invention is to preserve consistency of control and data structures in a facility shared by a plurality of programs when real or apparent errors in a link between the programs and shared facility occurs.

A more specific object of the invention is to provide a command responder that receives con, hands for execution from a plurality of command initiators on a plurality of links, and delays execution of subsequent commands until it is known that a command received on a link that appears to have a problem communicating between the initiator and the responder has executed to completion or will not executed at all.

A further object of the invention is to provide assurance to a program, as a command initiator, that a command responder is no longer executing a previously transmitted command on a link that appears to be in error, and that the ending status of the command can be accurately determined by the program.

These objects and other features and advantages are included in a preferred embodiment of the invention that is comprised of a structured electronic storage (SES) that interconnects, and is shared by, a plurality of central processing complexes (CPC's). This coupling of autonomous data processing systems into a system complex (Sysplex) creates a single system image to a user.

SES functions as a command responder to a plurality of command initiators in the form of programs operating in one or more CPC's. Each CPC transmits commands to SES over one or more message transmission links. A CPC channel expects to receive a response from SES within a predetermined time after transmitting a command for execution. If the response is not received, this fact must be communicated to the requesting program in the form of an Interface Control Check (IFCC). Although there may be an actual problem on the link that sent the command, the delay in the response may be the result of SES being too busy and that execution of the con, hand may still be in process. The CPC channel takes steps to delay posting of the IFCC until it is known the command has ended execution, either to accurate completion, or has been negated by returning all SES data to the state it was before the command was received.

SES is comprised of a bulk, non-volatile electronic storage, stored program SES processor for executing commands, and link hardware for communicating with CPC's. The bulk storage has global or system-wide control and data structures, and command initiator generated data structures. All of the structures in SES can be shared and manipulated by all the initiators, and where possible allows for concurrent execution of commands in SES. A consistent and accurate view of shared structures can be maintained by the well known use of locks that prevent access to certain structures by a program when another is in the process of manipulating the structure. As mentioned earlier, locks do not prevent an inconsistent view of data as between two initiators when one attempts a recovery from what appears to be an error on the link. This is because the command thought to be in error may in reality only be delayed. Subsequent execution of such a delayed command violates the ordering controlled by programming based on command completion.

Consistency of data or control structures in SES is maintained in situations that appear to be link errors by providing a command quiesce function in SES. When a CPC channel suspects a link error, signals are transmitted to SES which are interpreted by the link hardware as a request to quiesce the command received on the link. This causes SES to set an indicator associated with the link. When a subsequent command is received on any other link, the SES processor servicing that command scans all indicators, and prevents the start of command execution if any are found set.

After the request for command quiesce has been received, the command may in fact complete correct execution, or any changes made before quiesce will be undone to return structures to the status they were in before the command was received. When this is done, the indicator will be reset. At the option of a CPC program, an area in SES can be set aside to accumulate data and status as a command executes in SES. After the quiesce operation, the program can access the saved data or status and determine what further action if any is required for recovery.

DESCRIPTION OF THE PREFERRED EMBODIMENT

Figure 1:
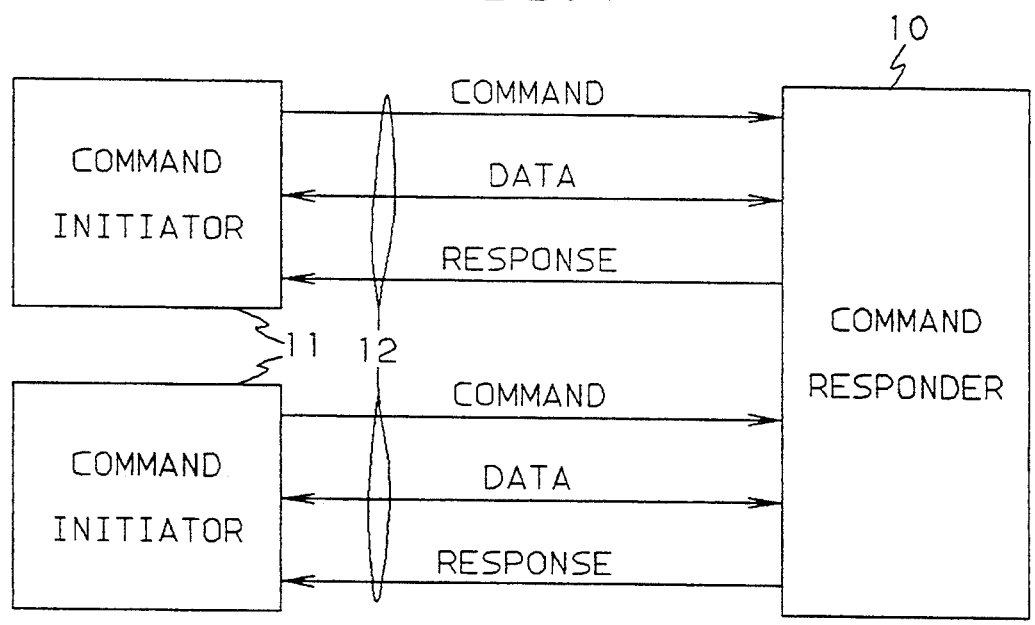
FIG. 1 is a block diagram for describing a general environment for practicing the present invention.

The block diagram of FIG. 1 depicts a generalized environment which can implement the present invention to advantage. It is comprised of a command responder 10 that responds to commands received from one or more command initiators 11 over one or more links 12. The actual configuration of a link 12 can take a number of forms. The link 12 could be a large parallel bus or a fiber optic pair that transmit in serial fashion or a bundled number of such links. In any case, the command responder 10 will receive a command to be executed at the request of a command initiator 11, with or without data, and provide a response back, with or without data. There can be a single command initiator 11 that transmits a plurality of commands in sequence, or more than one initiator 11 as shown. Either way, it is essential to preserve the proper sequence of command execution at the responder 10 in situations where there is a real or apparent problem on a link 12 as viewed by a command initiator 11.

Figure 2:
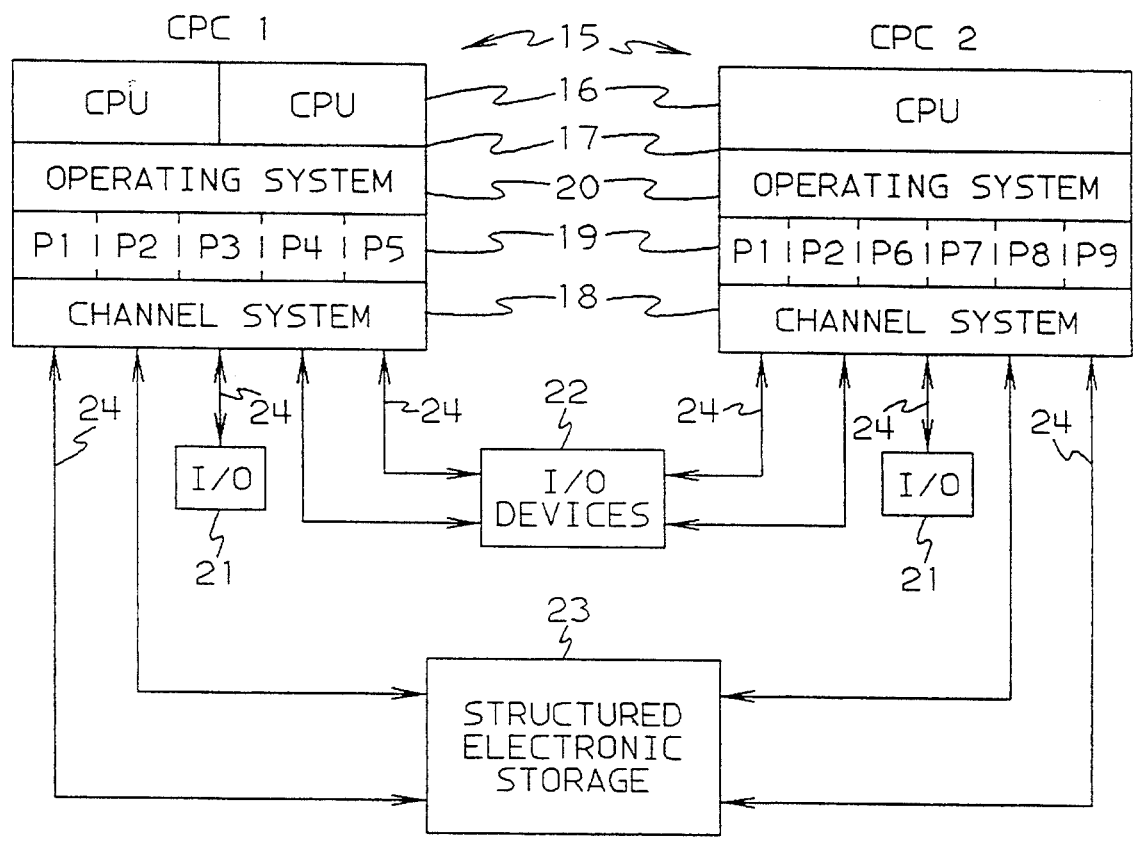
FIG. 2 is a block diagram of a data processing system complex that incorporates the present invention to provide shared usage of system-wide data and control structures.

The block diagram of FIG. 2 provides more detail of a preferred environment for practicing the present invention. It depicts the coupling together of at least two autonomous data processing systems into a system complex (Sysplex) that exhibits a single system image to a user. Autonomous data processing systems 15 are designated as Central Processing Complex (CPC) 1 and 2. CPC 1 and 2 can each be an International Business Machines ES/9000 data processing system.

An ES/9000 data processing system 15 is comprised of one or more Central Processing Units (CPU) 16, a main memory 17 and a channel system 18. Main memory 17 stores data which is manipulated by a plurality of stored application or utility programs 19 (P1-P9), all under the control of an operating system 20 such as the IBM MVS/SP control program. In a Sysplex environment, where fault tolerance and/or increased performance is desired, some of the programs 19 such as P1 and P2 may be duplicated in the systems 15.

The channel system 18 is comprised of a plurality of channel sub-systems (CSS) which connect each system 15 with various peripheral units. Certain of the peripheral units may be various I/O units 21 such as magnetic tapes, printers, direct access storage devices (DASD), or communication control units to provide connection of user terminals for example. Some I/O devices 22 may be shared by the two systems 15. The channel systems 18 are also shown in FIG. 2 to be connected to a Structured Electronic Storage 23 (SES) to be more fully described as part of the preferred embodiment of the present invention.

The paths 24 in FIG. 2 that connect the systems 15 to the various peripheral units are preferably fiber optic cable pairs that provide for serial, bidirectional transfer of information between the units. Commonly assigned U.S. Pat. Nos. 5,003,558 and 5,025,458 are incorporated by reference herein for their showing of various aspects of a CSS for synchronizing and decoding of serial data transmission between the systems 15 and, for example SES 23. The transmission of plural-byte message frames are the means for communicating commands and responses referred to in connection with FIG. 1.

Comparing FIG. 2 with the previous discussion of FIG. 1, the command responder 10 would be SES 23 or the shared I/O devices 22. The links 12 of FIG. 1 are the paths 24 of FIG. 2. In FIG. 2, a command initiator 11 of FIG. 1 could be viewed as being a system 15, program 19, or a CSS of channel system 18.

Figure 3:
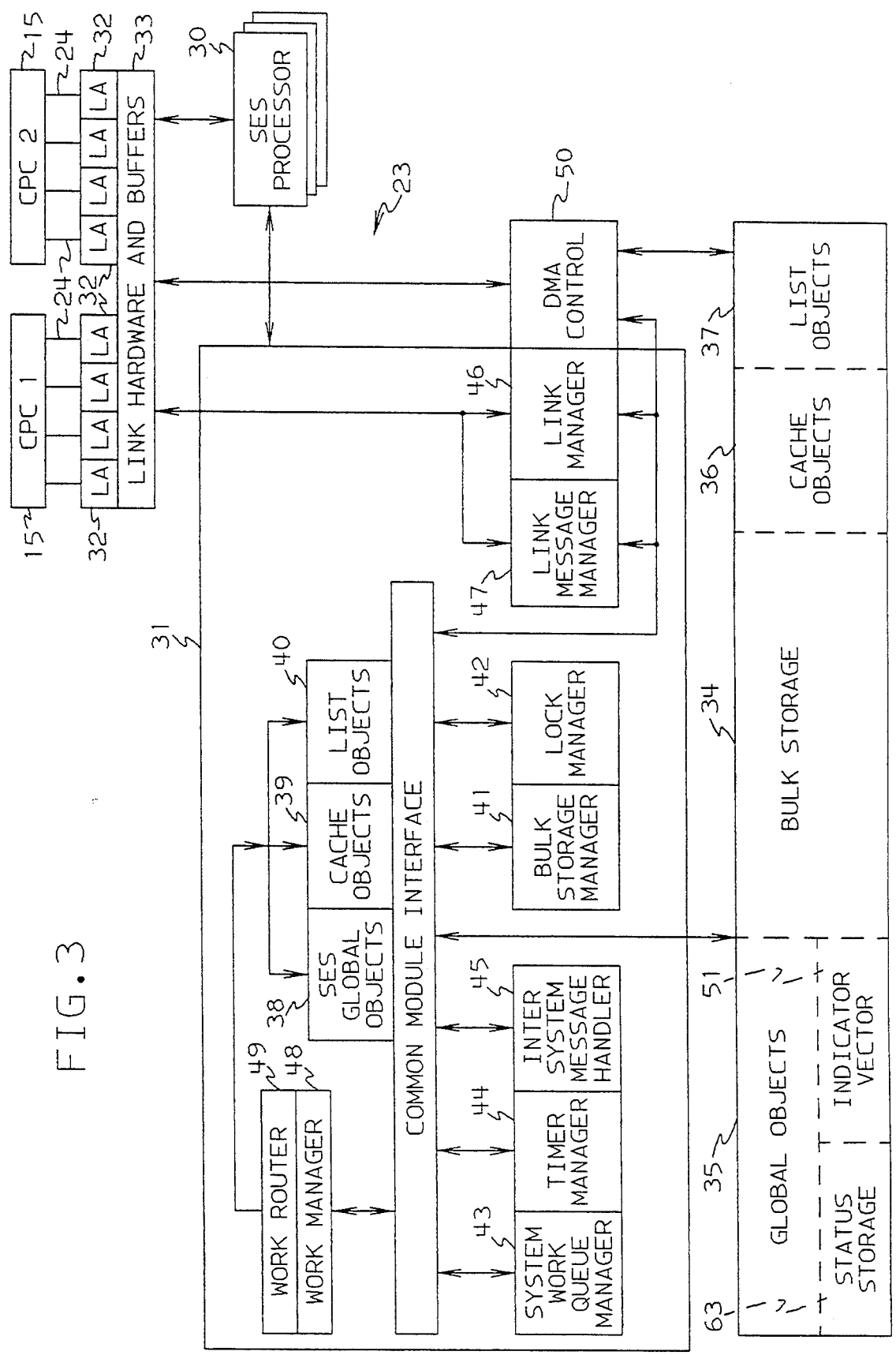
FIG. 3 is a block diagram of a Structured Electronic Storage (SES) depicting a processor and programming required to practice the present invention.

FIG. 3 is a block diagram of the Structured Electronic Storage (SES) 23 shown in FIG. 2. It depicts some of the functional hardware and stored programming which makes SES an intelligent bulk storage that is shared by several autonomous systems to create a Sysplex.

The intelligence of SES 23 is provided by one or more SES processors 30 with program and data storage 31 which executes commands received by SES from command initiators represented in FIG. 3 by CPC 1 and CPC 2 (data processing systems 15 of FIG. 2). Command and response messages transmitted serially over fiber optic cable pairs 24 interconnect a channel sub-system (CSS) of a system 15 with a corresponding link adapter (LA) 32. Link hardware and buffers 33 include comparable hardware to that in a CSS for synchronizing and decoding serial bits received on the fiber optic links 24. One or more link buffers can be provided for each link 24. Each buffer includes a section for receiving and storing a command, a section for storing a response for transmission to a CPC, and a section for storing data involved in any command or response.

In the environment of a Sysplex, and in order to achieve effectiveness at being able to spread workloads across multiple systems 15 and share the data among them, several data and control structures are centralized in SES 23. These structures are represented by data and control objects stored in a bulk storage 34 in SES 23. Bulk storage 34 is electronic and non-volatile by virtue of providing backup battery power in case of power system failure.

As shown in FIG. 3, objects stored in storage 34 can include global objects 35, cache objects 36, and list objects 37. These objects can be manipulated by commands received at SES 23 which are executed by the SES processor 30 in response to program sequences 38, 39, and 40 respectively in storage 31. Global objects 35 provide for overall Sysplex control. Cache objects 36 with associated directories provide for an intermediate level of caching as between DASD and the caches associated with individual CPU's of systems 15. Data consistency is maintained for data that is being shared and cached at various levels. List objects 37 could be various work queues being manipulated by various systems 15. As various objects are created, modified, or deleted in bulk storage 34, a bulk storage manager program sequence 41 will create/delete space and addressability to the objects in response to commands received by SES. Lock manager 42 will respond to commands that require various objects to be locked against access by any other command initiator until a present access is completed.

Certain overall Sysplex controls are executed by program sequences in storage 31 relating to system work queues 43, timers 44, and intersystem message transmissions 45. As commands are received by the link hardware and buffers 33, and analyzed by link manager 46, and link message manger 47 program sequences, a work manager 48 and work router 49 will initiate the proper program sequence to be executed by the SES processor 30. Transfer of data between the bulk storage 34 and data section of a link buffer 33 is performed by a DMA control 50.

In a Sysplex-environment supported by multiple systems 15 comprised of multiple CPU's and programs accessing SES, it is required that programing requests to modify the content of objects in SES are viewed in strict order. A command may access several objects in bulk storage 34, and the accesses must appear to be atomic as viewed by all command initiators. No store accesses for another command are permitted to any of the objects during the time that any of the objects are being fetched or stored by a previous command. No fetch accesses are permitted to any store type objects during any time the objects are being stored. The objects accessed by one command must occur after those of all preceding commands and before those of all subsequent commands as observed by any command initiator.

When data is shared between multiple users, it is essential that each user's access and update be done serially with respect to other users. To control this, systems that provide for the sharing of data across multiple users (which can be in a single or multiple systems) use locking mechanisms. A user must be granted a lock from the system prior to accessing the data. This lock will be granted to each user by the system one user at a time, thus insuring serialization. In a single system, these locks can be maintained in a systems main storage thus providing very high performance. Across multiple systems, the same very high levels of performance are also required if the sharing of data is to be effective.

A very responsive, low overhead mechanism is supported in SES to support the locking requirements in coupled systems. Very high levels of performance are achieved with special low overhead protocols on the links 24 interconnecting SES 23 with the systems 15. The rules previously recited about serializing execution of commands, providing command atomicity, and storage concurrency are maintained by the present invention even in the presence of real or apparent problems with the links 24, and without requiring the coordination of error recovery for other command initiators. The initiator that detects a possible problem may execute recovery procedures without causing loss of access to data and functions in SES by other attached systems.

With reference to FIG. 2, when a program 19 requires the use of SES 23, it will execute a send message instruction that identifies a channel in the channel subsystem (CSS) 18 and a command in memory 17 that is to be transmitted to SES 23.

With reference to FIG. 3, the command message received on link 24 will be received by a link adapter 32, deserialized and stored by the link hardware and buffers 33. An interrupt signaled to the SES processor 30 will activate the link manager 46 and link message manager 47 program sequences to initiate execution of the command by the proper program module. A response will be formulated, sent to the link hardware and buffers 33, and sent by the link adapter 32 over the link 24 to the command initiator.

Previous discussion has indicated the necessity of preserving the serial execution of commands by SES to insure consistent and accurate values for data shared by plural command initiators. When command execution results in various errors, it is necessary for commands to complete with data left in an accurate state. Commands can complete successfully or, through techniques well known, be "backed out". That is, any changes made to data before the error will be returned to a previous state as if the command had not started execution. The response normally returned to the program that initiated a command will reflect the status of the command completion, whether correctly or with an error.

After a channel subsystem (CSS) has responded to a send message instruction of a command initiating program, the CSS may determine that the link 24 to SES 23 may be in error after the message was transmitted. When the CSS or link adapter 32 on a link 24 are not transmitting data, they exchange idle characters to maintain synchronism. If the idles are not received by a CSS, it will indicate this fact in a status indicator and store a status pending state which can be tested by the program issuing the command. An apparent error would be signified by the failure of the CSS to receive a response back from SES after a predetermined time from sending the command. A reason the response has not been received could be the result of SES being too busy, and that although the command is executing, the response has not yet been formulated and returned. This too will provide a status pending state. The command initiating program will test the status pending state, and if set will execute a test subchannel instruction to obtain the IFCC status. Any recovery procedures can then be initiated.

When the IFCC is posted in the CSS where it is observable by the program, there are two requirements that must be met to retain proper command serialization at SES, and provide proper recovery action by the command initiating program that does not require coordination with any other command initiating program. First, the program must know the command execution has been quiesced, whether correctly to completion or as if not at all. Second, any commands received subsequently from any other command initiating program must not start execution at SES until it is known that the quiesced command for which IFCC has been posted has either ended to completion or will not execute at all.

A command quiesce function is provided in SES 23 to achieve the two requirements. In FIG. 3 one of the global objects 35 in bulk storage 34 is an indicator vector 51. The indicator vector 51 is comprised of a binary bit for each of the link adapters 32 provided with SES 23. In the example shown there will be eight bits in the indicator vector 51.

After a command has been received by a link adapter 32 and execution commenced, and the link adapter 32 subsequently detects a link initialization signal signifying a need to reestablish the link with the connected CSS, the link manager 46 program sequence will access the indicator vector 51 and set the bit associated with the link adapter 32 that received the initialization signal. The initialization signal may be manifested by the link adapter 32 detecting a loss of synchronization or loss of signals on the link 24. A third initialization signal is manifested by receipt of the link adapter 32 from the connected CSS of an invalidate buffer command to be explained subsequently in connection with FIG. 4.

When the bit of the indicator vector 51 is set, the SES processor 30 will end the command execution by correctly completing the command, or backing out any changes made to an object up to that time. In either case, the response and any data to be returned to the command initiator are discarded. The indicator bit is then reset.

Retaining correct command serialization in SES 23 is accomplished by causing the link message manager 47 program sequence to access the indicator vector 51 whenever it is called on to start execution of a command received by any link adapter 32. The program sequence tests the set or reset state of all the bits of the indicator vector 51, and if any are set, prevents the start of execution of the subsequent command until all bits of the indicator vector 51 that were set when accessed have subsequently entered the reset state.

Figure 4:
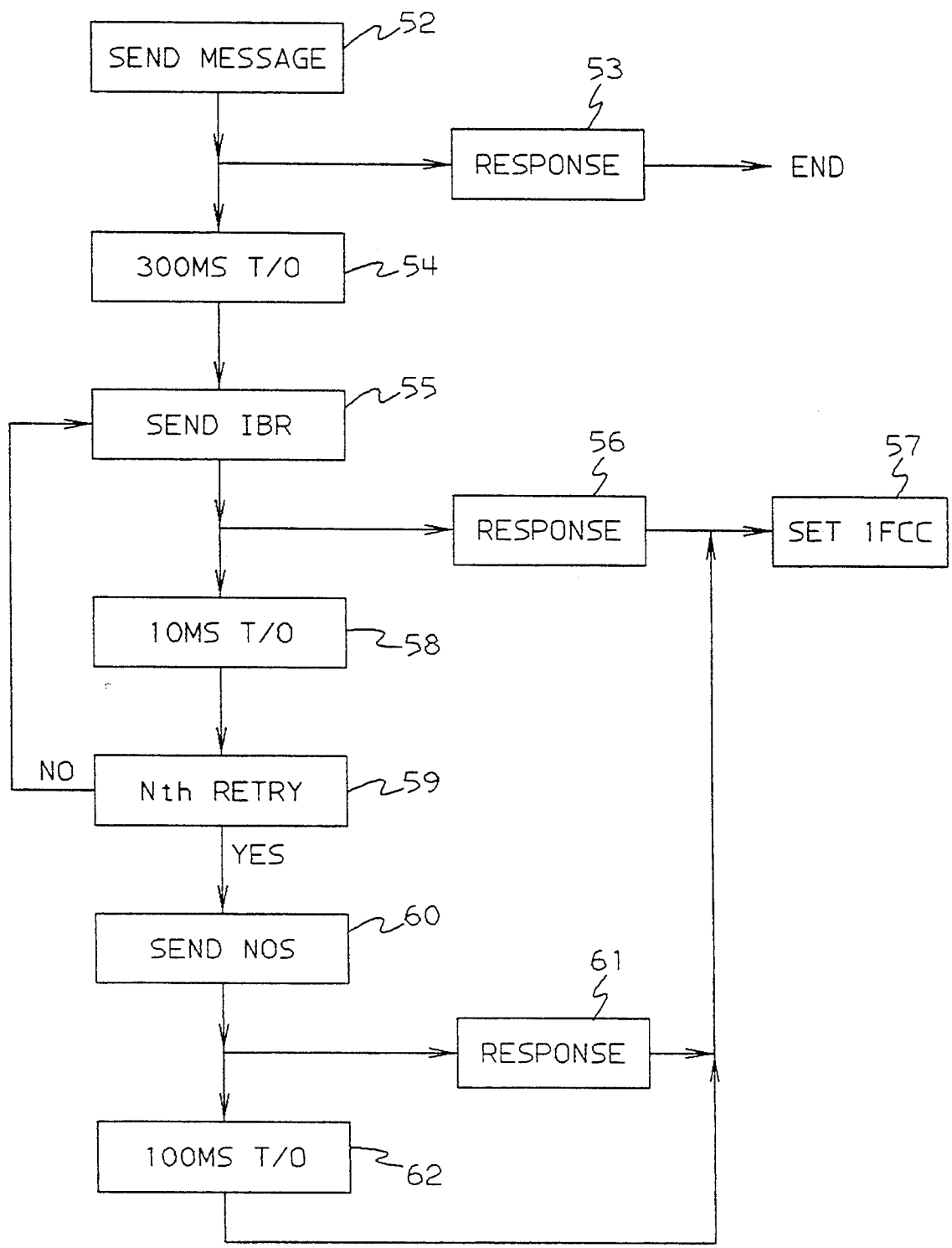
FIG. 4 is a flow diagram explaining the signals required on a link to SES to initiate the function performed by the present invention.

FIG. 4 is a flow chart to explain the actions taken by a CSS to insure that a previous command has been quiesced and any subsequent commands from any initiator will be observed to execute after the failing command before posting IFCC to the affected program. When there has been a send message transmitted 52 and a response to the command received 53, SES has completed execution of the command. If the response is not received before a 300 ms timeout 54, the CSS will send IBR (invalidate buffer request) 55. A response 56 to this will indicate that the link adapter 32 has set the quiesce indicator bit, allowing the CSS to then post the IFCC 57. After sending IBR 55, and there is no response 56 after a 10 ms time out 58, the CSS may retry the send IBR N times. After the Nth retry 59 the CSS will commence sending a continuous link initialization signal such as sequence of signals indicating a not operational state (NOS) 60. If the CSS receives a response to this sequence, or there is a 100 ms time out 62, IFCC 57 can be posted. This is due to the fact that the SES will treat the link as an error If synchronization is not established within the 100 ms loss of sync interval. At this point, the command initiating program knows the command will be observed as ended by any subsequent commands from all initiators, and can initiate any recovery or retry of the command as required. The program can proceed with recovery knowing that no subsequent commands from other command initiators have been adversely affected, or will be affected by any subsequent retry of the command if that is required.

Returning now to FIG. 3, one additional global object 35 in bulk storage 34 will be identified. That is status storage 63. A command initiating program can selectively set aside an area in bulk storage 34 for the purpose of collecting and storing status and/or data for commands as they execute in SES 23. At any time, whether as part of recovery from the previously described command quiesce function, or for any reason, the program can access the status storage area 63 for the purpose of determining the ending status of a command.

While we have illustrated and described a preferred embodiment of our invention, it is to be understood that we do not limit ourselves to the precise construction herein disclosed and the right is reserved to all changes and modifications coming within the scope of the invention as defined in the appended claims.

Having thus described our invention, what we claim as new and desire to secure by Letters Patent is:

1. A data processing system comprising:
   one or more command initiators;
   a command responder receiving one or more commands from one or more of said command initiators for execution by said responder;
   one or more links connecting said initiators to said responder;
   indicator means in said responder associated with each of said links, set by said responder, to indicate a possible problem with said link communication after receipt of a command on said link; and
   indicator testing means in said command responder, operative upon receipt of a subsequent command on any of said links, for preventing execution of the subsequent command if any of said indicator means is in the set state after receipt of a previous command.

2. A data processing system in accordance with claim 1 wherein:
   said command initiator includes:
   channel means for communicating a message on said link to said responder, said message including a command requesting action by said responder, said channel including response receiving means connected to said link, for receiving from said responder, response data related to the results of the action taken by said responder;
   time-out means in said channel, operable in the absence of the response data from said responder within a predetermined time after communicating a command to said responder, for transmitting a link initialization signal on said link to said responder;
   said command responder further includes:
   link initialization signal responsive means for setting said indicator means.

3. A data processing system in accordance with claim 2 wherein said channel means further includes:
   status indicating means, set by said channel means a predetermined time after transmitting said link initialization signal, for notifying a program in said con, hand initiator that said indicator means has been set.

4. A data processing system in accordance with claim 3 wherein said command responder further includes:

command execution means comprised of a program controlled processor with program storage comprised of program sequences for controlling said indicator testing means and, in the absence of the set state of any of said indicator means, starting execution of a received command.

5. A data processing system in accordance with claim 4 wherein said command execution means is further comprised of:

a program sequence, operative in response to receipt of said link initialization signal on said link which received the command for which execution has started, for setting said indicator means.

6. A data processing system in accordance with claim 5 wherein said command execution means is further comprised of:

means for ending command execution including normal completion of execution or undoing any results of execution prior to resetting said indicator means;

means for cancelling transmission of response data to said command initiator; and means for resetting said indicator means.

7. A data processing system in accordance with claim 6 wherein:

said command responder further includes:

status storage means for storing information related to the ending of command execution; and said command initiator further includes:

means for requesting transfer of the information from said status storage means to said command initiator.

8. In a data processing system including one or more command initiators, and one or more links for transmitting commands;

a command responder receiving one or more commands from one or more command initiators over the one or more links for execution by said responder;

indicator means in said command responder associated with each of the links, set by said responder, to indicate a possible problem with communications on the link after receipt of a command on the link; and indicator testing means in said command responder, operative upon receipt of a subsequent command on any of the links, for preventing execution of the subsequent command if any of said indicator means is in the set state after receipt of a previous command.

* * * * *

UNITED STATES PATENT AND TRADEMARK OFFICE
CERTIFICATE OF CORRECTION

PATENT NO. : 5,339,405
DATED : August 16, 1994
INVENTOR(S) : David A. Elko et al.

It is certified that error appears in the above-identified patent and that said Letters Patent is hereby corrected as shown below:

Column 9, line 1, "con.hand" should be --command--.

Signed and Sealed this

Eleventh Day of May, 1999

Attest:

Q. TODD DICKINSON

*Attesting Officer*   Acting Commissioner of Patents and Trademarks